United States Patent
Schindlbeck

(10) Patent No.: US 10,773,507 B2
(45) Date of Patent: Sep. 15, 2020

(54) METHOD FOR THE PREPARATION OF A SEMIFINISHED PRODUCT MADE OF FIBER MATERIAL PRIOR TO A WET-PRESSING PROCESS

(71) Applicant: Bayerische Motoren Werke Aktiengesellschaft, Munich (DE)

(72) Inventor: Martin Schindlbeck, Neufahrn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 460 days.

(21) Appl. No.: 14/744,559

(22) Filed: Jun. 19, 2015

(65) Prior Publication Data

US 2015/0290912 A1 Oct. 15, 2015

Related U.S. Application Data

(63) Continuation of application No. PCT/EP2013/074701, filed on Nov. 26, 2013.

(30) Foreign Application Priority Data

Dec. 20, 2012 (DE) .......... 10 2012 223 871

(51) Int. Cl.
*B29C 70/44* (2006.01)
*B32B 37/10* (2006.01)
(Continued)

(52) U.S. Cl.
CPC .......... *B32B 37/1018* (2013.01); *B29B 15/10* (2013.01); *B29C 70/443* (2013.01); *B32B 38/1858* (2013.01); *B32B 2309/68* (2013.01)

(58) Field of Classification Search
CPC .... B29C 70/443; B29C 70/548; B25B 11/005
(Continued)

(56) References Cited

U.S. PATENT DOCUMENTS

| 2,417,851 A | 3/1947 | Young |
| 3,165,432 A | 1/1965 | Plaskett |

(Continued)

FOREIGN PATENT DOCUMENTS

| AT | 283710 | 8/1970 |
| CN | 1082125 A | 2/1994 |

(Continued)

OTHER PUBLICATIONS

International Search Report (PCT/ISA/210) dated Apr. 28, 2014, with English translation (six (6) pages).

(Continued)

*Primary Examiner* — Scott W Dodds
(74) *Attorney, Agent, or Firm* — Crowell & Moring LLP

(57) ABSTRACT

A method is provided for the preparation of a semifinished product made of fiber material with an upper side and with an underside prior to a wet-pressing process. The method includes following steps: arrangement of a semifinished product made of fiber material with the underside on a preparation area with a large number of suction apertures, application of a reduced pressure to the underside of the semifinished product by way of the suction apertures, and introduction of a flowable matrix material by way of the upper side of the semifinished product.

5 Claims, 3 Drawing Sheets

(51) Int. Cl.
*B29B 15/10* (2006.01)
*B32B 38/18* (2006.01)

(58) Field of Classification Search
USPC .................................................. 156/285, 296
See application file for complete search history.

(56) References Cited

U.S. PATENT DOCUMENTS

| | | | |
|---|---|---|---|
| 2008/0169593 A1* | 7/2008 | Shen | B25B 11/005 269/21 |
| 2008/0197644 A1 | 8/2008 | Gebhart et al. | |
| 2009/0218713 A1* | 9/2009 | Miller | B29C 51/28 264/101 |
| 2010/0193115 A1* | 8/2010 | Inserra Imparato | B29C 70/342 156/245 |
| 2011/0139344 A1* | 6/2011 | Watson | B29C 73/12 156/94 |

FOREIGN PATENT DOCUMENTS

| | | |
|---|---|---|
| CN | 1150926 A | 6/1997 |
| DE | 225668 | 4/1909 |
| DE | 28 42 072 A1 | 3/1979 |
| DE | 40 16 348 A1 | 11/1991 |
| DE | 10 2005 023 487 A1 | 11/2006 |
| DE | 10 2006 012 895 A1 | 9/2007 |
| DE | 10 2010 042 349 A1 | 4/2012 |
| DE | 10 2011 056 703 A1 | 6/2013 |
| GB | 2 005 191 A | 4/1979 |
| WO | WO 01/32382 A1 | 5/2001 |

OTHER PUBLICATIONS

German Search Report dated Jul. 11, 2013, with partial English translation (ten (10) pages).
Chinese Office Action issued in counterpart Chinese Application No. 201380054921.X dated Mar. 23, 2016, with English translation (thirteen (13) pages).

* cited by examiner

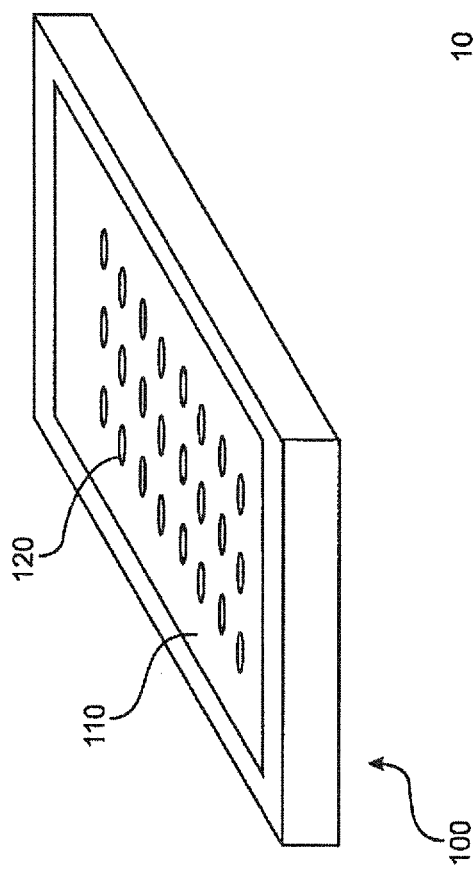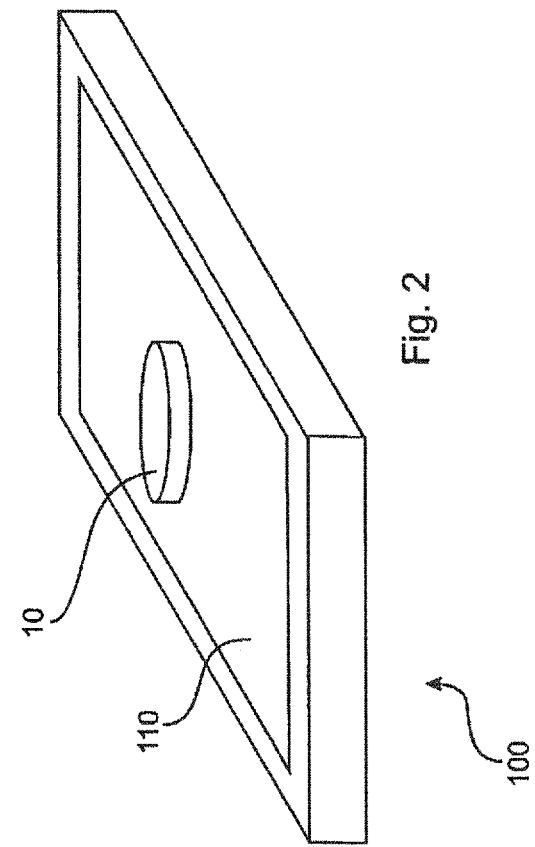

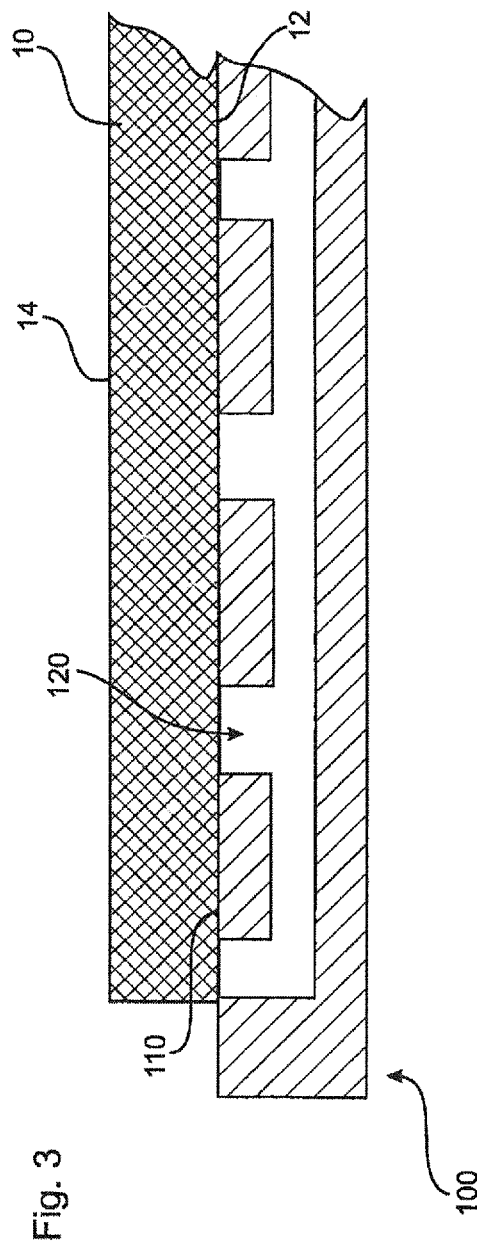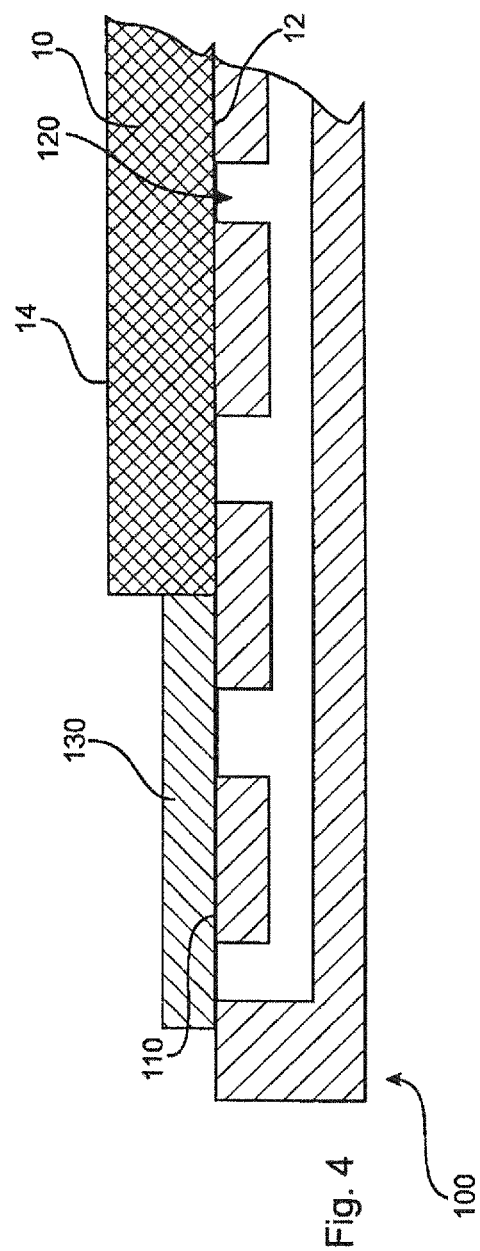

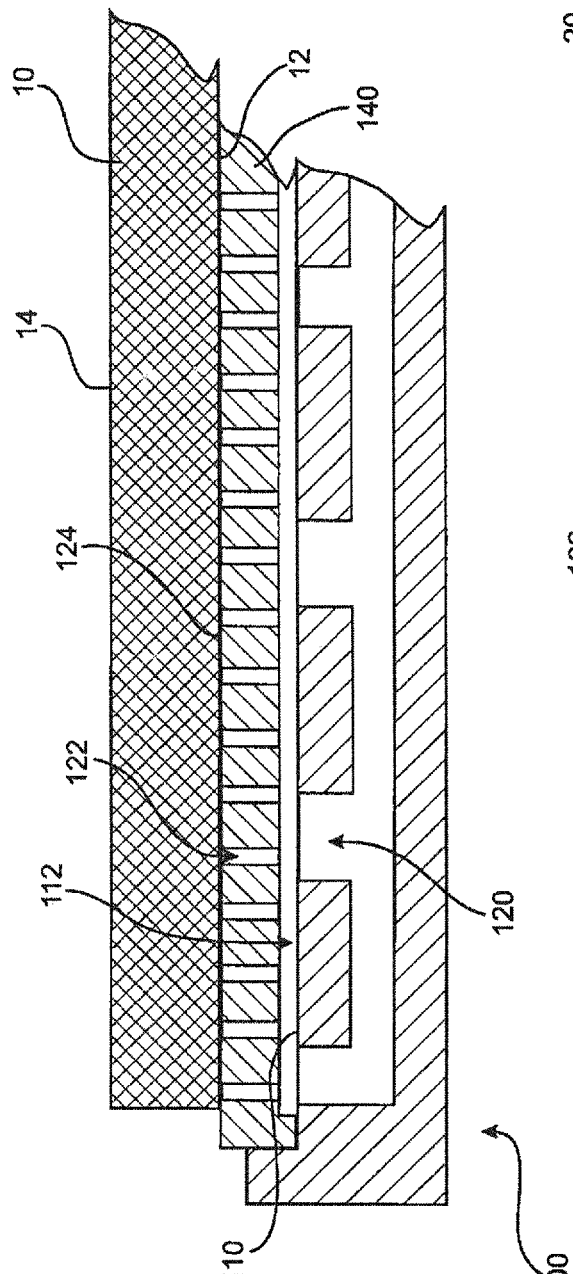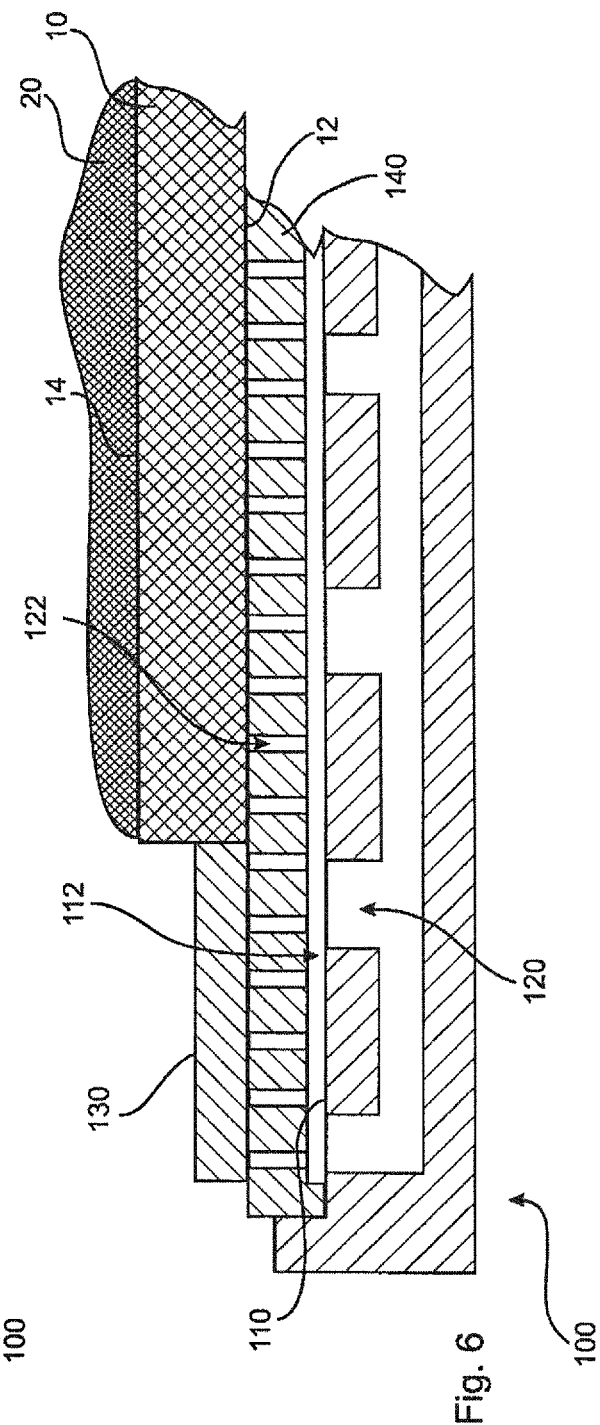

METHOD FOR THE PREPARATION OF A SEMIFINISHED PRODUCT MADE OF FIBER MATERIAL PRIOR TO A WET-PRESSING PROCESS

CROSS REFERENCE TO RELATED APPLICATIONS

This application is a continuation of PCT International Application No. PCT/EP2013/074701, filed Nov. 26, 2013, which claims priority under 35 U.S.C. § 119 from German Patent Application No. 10 2012 223 871.9, filed Dec. 20, 2012, the entire disclosures of which are herein expressly incorporated by reference.

BACKGROUND AND SUMMARY OF THE INVENTION

The present invention relates to a method for the preparation of a semifinished product made of fiber material prior to a wet-pressing process, as well as to a preparation device for the preparation of the semifinished product made of fiber material prior to the wet-pressing process.

Methods for the preparation of semifinished products made of fiber material prior to wet-pressing processes are known in principle. For instance, so-called stacks that are embodied as multilayer fiber material are placed on preparation surfaces having a table form. Then, a flowable matrix material is introduced as a matrix substance from the upper side. Once the matrix substance has passed through and penetrated essentially all of the fiber material of the semifinished product, the saturated semifinished product may then be placed into the wet-pressing tool. There, the wet-pressing process is performed. However, in order to also be able to adequately saturate particularly thick semifinished products made of a plurality of layers of fiber material, it is not enough to introduce the matrix substance just from the upper side. On the contrary, for adequate saturation of the fiber material when the semifinished product is in multiple fiber layers, the semifinished product must be divided up. For instance, a maximum of approximately three to five-layer semifinished products are possible so that, for semifinished products that are thicker, individual semifinished product stacks must be placed on top of one another in a sandwich-like fashion. The matrix substance is introduced between the individual contact layers of the individual semifinished product stacks and may thus penetrate intimately into each semifinished product stack.

The tremendous complexity required for producing the individual semifinished product stacks is a drawback for the known methods. For instance, a plurality of individual semifinished product stacks, and not just one single semifinished product, must be produced for an entire structural component. The semifinished products are frequently unrolled from rolls of woven or nonwoven fabric made of fiber material, different layers being created from a plurality of rolls. This is followed by a cutting process to define the basic geometry of the semifinished product by cutting. If a plurality of two or even more different semifinished product stacks are needed to introduce the matrix substance in a sandwich-like fashion, at the least this also doubles the cutting process, the transport process, and all of the other steps starting from the production of the semifinished product all the way to saturating it with the matrix substance. If three or even more individual semifinished product stacks are needed, the complexity described consequently increases three-fold or more. This is critical in particular with respect to the time needed for production. The costs also rise sharply.

It is the object of the present invention to eliminate at least some of the drawbacks described in the foregoing. In particular, it is the object of the present invention to provide a method for the preparation of a semifinished product made of fiber material prior to a wet-pressing process, as well as to provide a corresponding preparation device that permits the flowable matrix substance to be introduced in a simple and cost-effective manner, even for thick semifinished products.

This and other objects are achieved according to the invention by a method for preparing a semifinished product made of fiber material, and having an upper side and an underside, prior to a wet-pressing process. The inventive method includes the following steps:

arranging a semifinished product made of fiber material with the underside on a preparation surface having a large number of suction apertures;

applying a negative pressure to the underside of the semifinished product via the suction apertures; and introducing a flowable matrix substance via the upper side of the semifinished product.

Thus, in one aspect of the invention, the material substance is introduced in a flowable manner exclusively via the upper side of the semifinished product. This makes it possible to do without the sandwich-like introduction of the matrix substance. In accordance with the invention, assistance is provided in order to ensure adequate penetration of the flowable matrix substance, regardless of the thickness of the semifinished product, that is, regardless of the number of layers of fiber material for the semifinished product. This assistance is provided by the negative pressure on the underside of the semifinished product.

If the semifinished product is arranged on the preparation surface with a large number of suction apertures, a negative pressure may then be applied to the underside. This negative pressure is generated, for example, using a compressor. By way of the negative pressure, a suction effect is created from the upper side of the semifinished product towards the underside. If a flowable matrix substance is now applied to the upper side of the semifinished product, in addition to the acting capillary forces and in addition to the acting gravity, this negative pressure assists the introduction of the flowable matrix substance. In other words, a fluid front for the matrix substance forms, which, and in addition to the previously mentioned effects, is also drawn through the thickness of the semifinished product by the negative pressure.

Naturally, a sensor element may be provided in the suction apertures to prevent the matrix substance from being introduced into these suction apertures. According to one advantageous development, it is also possible for a precise time control element to be used to define the point in time when the semifinished product has been completely penetrated by the flowable matrix substance. In the latter case, it would also be possible to do without complex sensor elements.

Proceeding from the preparation method in accordance with the present invention, the saturated semifinished product may now be placed, in a known manner, in a subsequent wet-press molding tool. The wet-pressing step for the wet-pressing process is then performed in the conventional and known manner.

The semifinished product in the context of the present invention is, in particular, a multilayer component, particularly preferably having a thickness that is relatively thick, in the range of approximately 2 to approximately 4 mm or more. A vacuum in the range of between approximately −0.2 bar and approximately −0.6 bar, in particular, is used for the negative pressure. Naturally, compressor devices may be used that can generate the negative pressure using a fluid-communicating connection to the suction apertures.

The semifinished product may also be called a stack, depending on how it is structured. The semifinished product may be produced in a known manner, for example, from rolls. Non-woven fabrics or woven fabrics or scrim made of the fiber material may be used.

In accordance with the inventive method, it is also possible, in particular, to saturate semifinished products that have complex geometries. Complex geometries shall be construed especially to include thick components and components with steep component edges. A steep component edge is defined by the side angle with respect to the horizontal in the wet-press molding tool, which is in the range between approx. 50° and approx. 90°.

After being introduced, the matrix substance is cured within the wet-pressing process. A resin substance, for instance, especially an epoxide resin, may be used as the matrix substance.

The method according to the invention may be refined in that arranged on the preparation surface is a stencil that covers sections of the suction apertures and, in particular, corresponds to the geometric shape of the semifinished product. A stencil shall be construed to be an element that is placed on the preparation surface. Correspondence with the geometric shape of the semifinished product shall be construed to mean, in particular, framing the semifinished product. In addition to framing, however, overhanging or overlapping the semifinished product is also possible. The stencil covers the suction apertures in a manner such that there are two options for how the stencil is embodied. First, it may be that the stencil is embodied impermeable to fluid, that is, the suction apertures at this location have no effect. However, it is also possible for the stencil to have its own interchangeable suction apertures that are distributed differently than the other suction apertures. Thus, the suction performance is changed so that the negative pressure may be varied. This supports the intentional application of negative pressure in individual sections of the semifinished product. However, the simplest solution is a stencil that is impermeable to fluid that is placed encircling the semifinished product. This makes it possible to use a large preparation surface, even for small semifinished products, without it being necessary to adjust the preparation surface. It is also possible to prepare a large number of semifinished products at the same time in the inventive manner.

Another advantage is obtained when, prior to the semifinished product being arranged on the preparation surface, an interchangeable insert adapted to the semifinished product is arranged on the preparation surface. In contrast to a stencil, an interchangeable insert shall be construed to mean a component that is inserted into the preparation surface, e.g. into a depression. The interchangeable insert may also be embodied both impermeable to fluid and having its own alternative apertures. Thus it may be adapted to the geometric shape of the semifinished product in the same manner as was described for the stencil. It is also possible for a defined negative pressure to be applied to individual sections of the semifinished product in a targeted manner using different interchangeable apertures.

Moreover, it is advantageous when the semifinished product made of fiber material is embodied as a multilayer semifinished product, especially with more than six layers. Thicknesses preferably in the range of approx. 2 mm to approx. 4 mm are provided. The thicker the semifinished product, the greater the advantage of the inventive method, because it is possible for the matrix substance to be introduced continuously from the upper side. However, the inventive method even provides advantages for thin semifinished products, since, in particular, it is possible to introduce the matrix substance more rapidly and thus a savings in time is achieved.

The method according to the invention may be refined in that at least sections of the semifinished product made of fiber material have the fibers in one of the following forms:
Fiber non-woven fabric,
Fiber woven fabric.

Combinations of the possible forms of the previously mentioned, non-exhaustive list are possible in the context of the invention. Preferably, the individual fibers, that is, the fiber non-woven fabric or the fiber woven fabric, are arranged on roller tracks that may be placed one on top of the other, unrolled together and cut. This is a particularly cost-effective and simple way to produce the semifinished product.

The subject-matter of the present invention is likewise a preparation device for the preparation of a semifinished product made of fiber material prior to a wet-pressing process. Such a preparation device has a preparation surface for arranging the underside of the semifinished product. The inventive preparation device is distinguished in that the preparation surface has a large number of suction apertures that are configured for applying a negative pressure to the underside of the semifinished product. A compressor device that is in fluid-communicating connection with the suction apertures may be provided, for instance. The preparation surface may have corresponding fluid connectors for this purpose. The preparation device is used in particular for executing an inventive method such that the same advantages are attained using the inventive preparation device as have been explained in detail with respect to an inventive method.

The preparation device may be further developed in that an interchangeable insert and/or a stencil that covers the suction apertures of an interchangeable section is provided for at least one interchangeable section of the preparation surface. It is also possible to use combinations of interchangeable insert and stencil. Refer to the pertinent paragraphs relating to the method for definitions of the terms "interchangeable insert" and "stencil." In both cases, interchangeable insert and/or stencil may be impermeable to fluid and may also be provided with their own interchangeable suction apertures. Naturally it may be provided that the interchangeable insert and/or the stencil may be fixed using fixing devices in order to maintain a defined position while the method is executed. In particular with large numbers of a defined shape for the semifinished product, such components in the form of interchangeable insert and/or stencil are advantageous because the speed when changing between two semifinished products may be increased significantly.

It is also advantageous when, in one embodiment of the preparation device, the interchangeable insert and/or the stencil has its own interchangeable suction apertures that are connected to the suction apertures of the preparation surface in a fluid-communicating manner. In particular, the interchangeable insert and/or the stencil may have a sub-volume over the surface so that the fluid-communicating connection is made available in a particularly cost-effective and simple manner. Thus closed and opened regions may be provided in a simple manner within the interchangeable insert and/or the stencil. The surface-area variation of the pressure or a pre-defined pressure distribution may thus be applied to the underside of the semifinished product in a particularly cost-effective and simple manner.

When providing interchangeable suction apertures, it may be advantageous for the suction apertures, and/or the interchangeable suction apertures in the inventive preparation device, to be distributed uniformly or essentially uniformly. This uniform or essentially uniform distribution provides for cost-effective and simple production of the component in question. It is also possible to attain in a uniform manner an essentially continuous fluid front when introducing the matrix substance. Naturally, uniformly distributed suction apertures may be combined with non-uniformly distributed interchangeable suction apertures and vice versa.

Alternatively, in an embodiment of the preparation device, it is also possible for the suction apertures and/or the interchangeable suction apertures to be distributed in a non-uniform manner in order to provide different suction sections. In this manner pressure distributions that extend two-dimensionally are possible. There may also be an adaptation to regions of the semifinished product that have different thicknesses so that the pressure distribution reflects the thickness distribution and thus an appropriately embodied fluid front is produced.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a perspective view depicting a first embodiment of an inventive preparation device;

FIG. 2 is a perspective view depicting the embodiment in FIG. 1 with a semifinished product placed thereupon;

FIG. 3 is a cross-sectional view depicting another embodiment of an inventive preparation device;

FIG. 4 is a cross-sectional view depicting an inventive preparation device with a stencil;

FIG. 5 is a cross-sectional view depicting an embodiment of an inventive preparation device with an interchangeable insert; and, FIG. 6 is a cross-sectional view depicting the embodiment in FIG. 5 with the addition of a stencil.

DETAILED DESCRIPTION OF THE DRAWINGS

FIGS. 1 and 2 depict a first embodiment of an inventive preparation device 100. It is configured in a table-like fashion and has a preparation surface 110 on its surface. Depicted schematically on the preparation surface 110 are a large number of suction apertures 120, distributed essentially evenly. For the sake of better clarity, the suction apertures 120 are not shown in FIG. 2. The semifinished product 10 made of fiber material is arranged on this preparation surface 110.

FIG. 3 depicts another embodiment of an inventive preparation device 100, in cross-section. The preparation surface 110 may be seen oriented upward. A fluid channel in the interior of the preparation surface 110 may also be seen and connects the individual suction apertures 120 to one another and leads outward via a fluid connector (not shown) to a compressor. The underside 12 of the semifinished product 10 is placed onto the preparation surface 110 so that the upper side 14 is on top. If a negative pressure is applied now, this negative pressure will act on the underside 12 of the semifinished product 10 via the suction apertures 120. A matrix substance 20 (see FIG. 6) applied to the upper side 14 is thus drawn downward toward the suction apertures 120 with the assistance of the negative pressure. Thus the introduction of the flowable matrix substance 20 is supported by the negative pressure.

If the semifinished product 10 has a smaller geometric extension than the preparation surface 110, stencils 130 may be used. FIG. 4 depicts such a stencil 130 in a form impermeable to fluid. It covers those suction apertures 120 that are not covered by the semifinished product 10. Thus the applied negative pressure acts solely on the suction apertures 120 on the underside 12 of the semifinished product 10 on which the semifinished product 10 is disposed. In other words, the stencil 130 prevents leaks at the exposed suction apertures 120.

FIG. 5 depicts an embodiment of the preparation device 100 having an interchangeable insert 140. This interchangeable insert 140 is provided with a large number of interchangeable suction apertures 122. The latter are themselves connected to one another with an interchangeable section in a fluid-communicating manner such that this hollow space of the interchangeable section 112 is placed onto the preparation surface 110. Now a negative pressure is applied via the suction apertures 120 and itself acts on the underside 12 of the semifinished product 10 via the interchangeable suction apertures 122. Here, the matrix substance 20 is again applied (as depicted e.g. in FIG. 6) and introduced into the semifinished product 10 with the assistance of the negative pressure.

FIG. 6 depicts one possibility for a combination of a stencil 130 and an interchangeable insert 140. These cooperate such that the stencil 130 now prevents leaks from otherwise exposed interchangeable suction apertures 122.

REFERENCE LIST

10 Semifinished product
12 Underside
14 Upper side
20 Matrix substance
100 Preparation device
110 Preparation surface
112 Interchangeable section
120 Suction aperture
122 Interchangeable suction aperture
124 Suction sections
130 Stencil
140 Interchangeable insert The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for preparing a semifinished product, the method comprising the acts of:
arranging an underside of the semifinished product made of fiber material on a preparation surface having suction apertures, the semifinished product covering some of the suction apertures;
applying a negative pressure to the underside of the semifinished product via the suction apertures;

introducing a flowable matrix substance through an upper side of the semifinished product; and arranging a stencil that is impermeable to fluid on the preparation surface, the stencil covering suction apertures that are not covered by the semifinished product, the stencil having a geometric shape corresponding to that of the semifinished product, wherein the semifinished product is prepared prior to a wet-processing process, and wherein the stencil is configured to direct the flowable matrix substance into the semifinished product.

2. The method according to claim 1, further comprising the act of:

prior to arranging the underside of the semifinished product on the preparation surface, arranging an interchangeable insert adapted to the semifinished product on the preparation surface.

3. The method according to claim 1, further comprising the act of:

prior to arranging the underside of the semifinished product on the preparation surface, arranging an interchangeable insert adapted to the semifinished product on the preparation surface.

4. The method according to claim 1, wherein the semifinished product made of fiber material is a multilayer semifinished product comprising more than six layers.

5. The method according to claim 1, wherein at least sections of the semifinished product made of fiber material have fibers in fiber non-woven fabric form.

* * * * *